(12) United States Patent
Terada et al.

(10) Patent No.: US 7,531,222 B2
(45) Date of Patent: May 12, 2009

(54) LIQUID-CRYSTALLINE POLYMER BLEND AND COMPOSITION COMPRISING THE SAME

(75) Inventors: Hiroaki Terada, Ikeda (JP); Motoki Asahara, Sanda (JP); Hiroyuki Kato, Kawanishi (JP)

(73) Assignee: Ueno Fine Chemicals Industry, Ltd., Osaka-fu (JP)

( * ) Notice: Subject to any disclaimer, the term of this patent is extended or adjusted under 35 U.S.C. 154(b) by 196 days.

(21) Appl. No.: 11/588,293

(22) Filed: Oct. 27, 2006

(65) Prior Publication Data

US 2007/0102667 A1 May 10, 2007

(30) Foreign Application Priority Data

Oct. 28, 2005 (JP) .............................. 2005-314754

(51) Int. Cl.
*C09K 19/00* (2006.01)
*C09K 19/52* (2006.01)

(52) U.S. Cl. .......................... 428/1.1; 428/1.2; 430/20; 252/299.01

(58) Field of Classification Search ................... 428/1.1, 428/1.2; 430/20; 252/299.01
See application file for complete search history.

(56) References Cited

U.S. PATENT DOCUMENTS 4,330,457 A   5/1982  East et al.
4,567,227 A   1/1986  Kiss
6,994,896 B2 * 2/2006  Sethumadhavan et al. .... 428/1.6

FOREIGN PATENT DOCUMENTS

| EP | 0 053 940 A1 | 6/1982 |
| JP | 57-172921 A | 10/1982 |
| JP | 61-51032 A | 3/1986 |
| JP | 61-120851 A | 6/1986 |

* cited by examiner

*Primary Examiner*—Geraldina Visconti
(74) *Attorney, Agent, or Firm*—Sughrue Mion, PLLC

(57) ABSTRACT

The present invention provides a liquid-crystalline polymer blend which is obtained by combining liquid-crystalline polymer (A) which has a modulus of elongation of 20-32 GPa and a melting point measured by differential scanning calorimeter of 250-330° C. and liquid-crystalline polymer (B) which has a melting point measured by differential scanning calorimeter of equal to or higher than 190° C. and lower than 250° C., wherein the weight ratio of said liquid-crystalline polymer (A) to said liquid-crystalline polymer (B) is in the range of from 50:50 to 90:10. The liquid-crystalline polymer blend and the liquid-crystalline polymer blend composition comprising the same exhibit good mechanical properties such as modulus of elongation and good molding processability at low temperatures. The liquid-crystalline polymer blend and the liquid-crystalline polymer blend composition of the present invention are suitable for producing welded articles with high joint strength.

14 Claims, 1 Drawing Sheet

LIQUID-CRYSTALLINE POLYMER BLEND AND COMPOSITION COMPRISING THE SAME

TECHNICAL FIELD

The present invention relates to a liquid-crystalline polymer blend which exhibits high modulus of elongation and excellent molding flowability as well as excellent molding processability at low temperatures, and a liquid-crystalline polymer blend composition comprising the same.

BACKGROUND ART

Thermoplastic liquid-crystalline polymer (which is called as liquid-crystalline polymer or LCP hereinafter) has good properties including heat resistance, mechanical properties such as rigidity, chemical resistance and dimensional accuracy. Due to those properties, LCPs are used not only for manufacturing molded articles but also for a variety of products including fibers and films. Particularly, personal computers and mobile phones employ highly integrated devices and the art wishes to use downsized, thinner and smaller parts for them. In the information and telecommunication fields, very thin parts are sometimes required. Based on the excellent properties of the LCPs, consumption of the LCPs has been increasing.

Recently, indoor equipments of air-conditioning machines are required to be downsized, and the art wishes to use downsized, thinner and smaller parts for indoor equipments such as a cross flow fan. Conventionally, plastic materials such as acrylic styrene resin have been used for manufacturing cross flow fans. However the acrylic styrene resin is not suitable for parts of 0.8 mm or less of the thickness. It is difficult to completely fill a die for such a thin part using said resin by injection molding. In addition, the cross flow fan made of the acrylic styrene resin tends to be deformed due to warpage of parts. Moreover, high-speed rotation of the cross flow fan is required to compensate the decrease in blast volume due to downsizing of the indoor equipment. For manufacturing downsized cross flow fans, the art desires a material with high modulus of elongation and high mechanical strength which is resistant to high-speed rotation. LCPs are thought to hold promise as materials which may solve the problem due to downsizing of parts and may show high mechanical strength.

Among the various liquid-crystalline polymers, a liquid-crystalline polyester amide comprising a certain amount of 6-oxy-2-naphthoyl repeating unit in its molecular chain shows high modulus of elongation (Japanese Patent Application Laid Open No. Sho. 57-172921 equivalent to U.S. Pat. No. 4,330,457 and Japanese Patent Application Laid Open No. Sho. 61-51032, the contents of those references are herein incorporated by the reference). However, the liquid-crystalline polymers with high modulus of elongation may generally exhibit high melt viscosity and low flowability and therefore, are not suitable for manufacturing molded articles having thin parts.

In addition, LCPs have higher melting point and require higher processing temperature than resin materials such as acrylic styrene resin conventionally used for producing cross flow fans. Accordingly, if parts made of such LCPs were subjected to secondary processing such as welding, a jointed article with sufficient joint strength could hardly be obtained.

Accordingly, LCPs which exhibit appropriate valance between molding flowability and modulus of elongation as well as excellent molding processability at low temperatures are desired. Parts made of such LCPs may be easily processed by a secondary processing operation such as welding.

In order to improve the flowability of LCPs with high modulus of elongation, for example, a polymer blend comprising a liquid-crystalline polyester amide such as those disclosed in Japanese Patent Application Laid Open No. Sho. 57-172921 equivalent to U.S. Pat. No. 4,330,457 and Japanese Patent Application Laid Open No. Sho. 61-51032 and a wholly aromatic liquid-crystalline polyester (see Japanese Patent Application Laid Open No. Sho. 61-120851 equivalent to U.S. Pat. No. 4,567,227) has been proposed. However said polymer blend needs to be processed at temperatures equal to or higher than 250° C. and exhibits poor molding processability at low temperatures. The molding flowability of the polymer blend is also not satisfiable. In addition, due to its high processing temperature, the polymer blend has only poor weldability and is not suitable for manufacturing downsized cross flow fans.

SUMMARY OF THE INVENTION

An object of the present invention is to provide a liquid-crystalline polymer material which is suitable for manufacturing a molded article like a cross flow fan for indoor equipment of air-conditioning machine and exhibits excellent mechanical properties such as high modulus of elongation, excellent molding processability at low temperatures and excellent flowability.

The present invention provides a liquid-crystalline polymer blend which is obtained by combining (A) a liquid-crystalline polymer which has a modulus of elongation of 20-32 GPa and a melting point measured by differential scanning calorimeter of 250-330° C., and (B) a liquid-crystalline polymer which has a melting point measured by differential scanning calorimeter of equal to or higher than 190° C. and lower than 250° C., wherein the weight ratio of said liquid-crystalline polymer (A) to said liquid-crystalline polymer (B) is in the range of from 50:50 to 90:10.

Preferably, the liquid-crystalline polymer blend of the present invention has a melting point measured by differential scanning calorimeter of equal to or higher than 200° C. and lower than 250° C.

The liquid-crystalline polymer blend of the present invention exhibits good mechanical properties, good flowability upon molding and good molding processability at low temperatures. Molded parts of the liquid-crystalline polymer blend of the present invention are excellent in weldability.

In the specification and claims, the term "liquid-crystalline polymer blend" means a polymer blend which is obtained by combining the above defined liquid-crystalline polymers (A) and (B) so that the weight ratio of said liquid-crystalline polymer (A) to (B) is in the range of from 50:50 to 90:10. The liquid-crystalline polymer blend of the present invention essentially consists of the liquid-crystalline polymer (A) and the liquid-crystalline polymer (B).

In the specification and claims, the term "liquid-crystalline polymer blend composition" means a composition which contains the liquid-crystalline polymer blend defined above and other ingredients such as filler, reinforcement and the like.

DETAILED DESCRIPTION OF THE PREFERRED EMBODIMENTS

Figure 1:
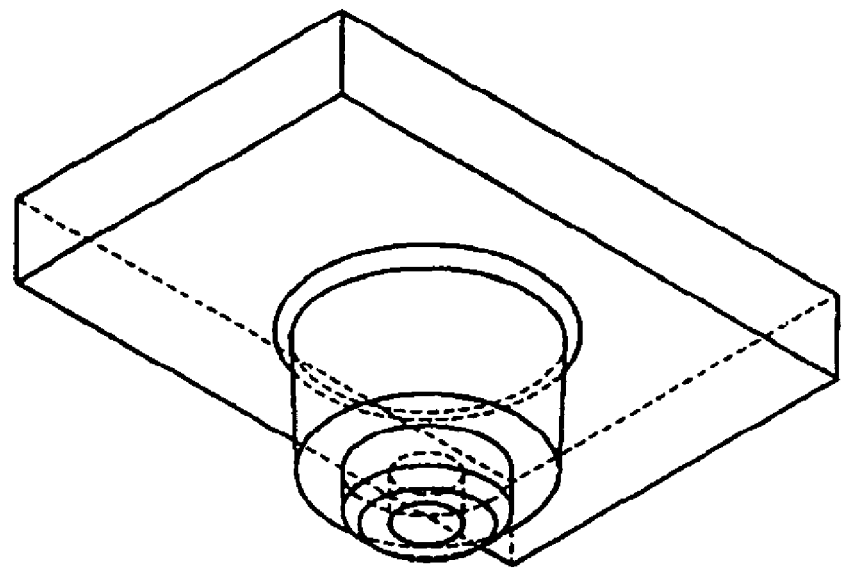
FIG. 1 depicts the share joint used as a test piece for the ultrasonic welding.
Figure 1:
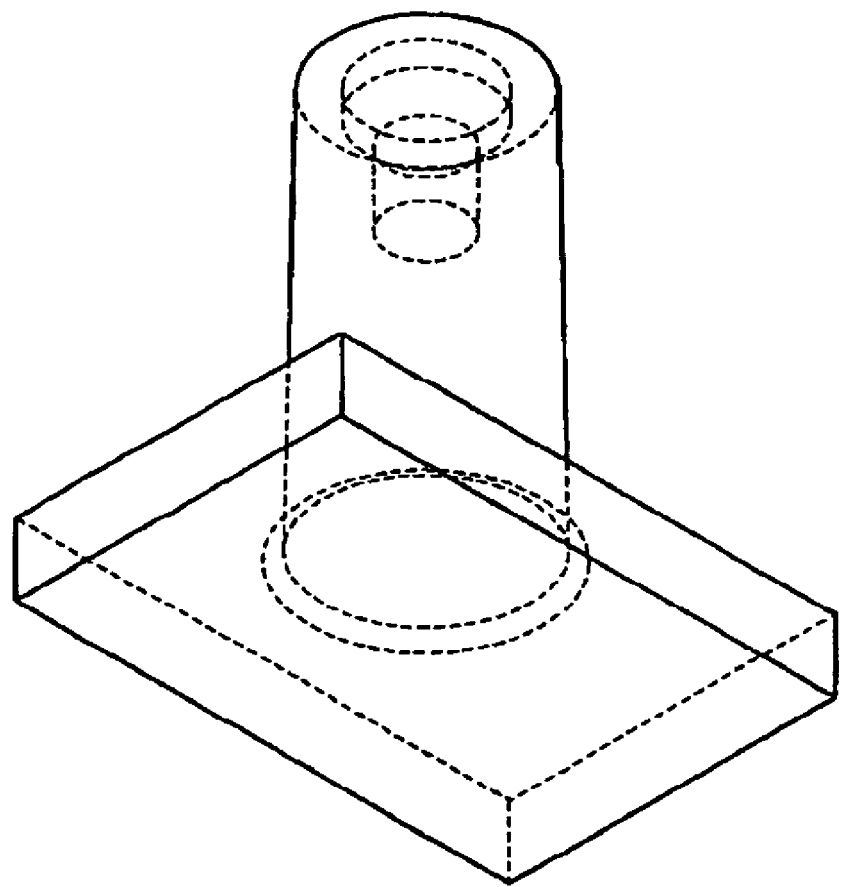

At first, the liquid-crystalline polymer (A) contained in the liquid-crystalline polymer blend of the present invention is described.

The liquid-crystalline polymer (A) is liquid-crystalline polyester or liquid-crystalline polyester amide which exhibits anisotropic melt phase and is called as thermotropic liquid-crystalline polymer by those skilled in the art.

The anisotropic melt phase of the liquid-crystalline polymer (A) can be confirmed by means of conventional polarized light system using orthogonal light polarizer. In more detail, the sample on the Leitz's hot stage under nitrogen atmosphere may be observed with Leitz's polarization microscope.

The liquid-crystalline polymer (A) used for the present invention is not specifically limited and may be any liquid-crystalline polymer which has a modulus of elongation of from 20 to 32 GPa and has a melting point measured by differential scanning calorimeter of 250-330° C. Preferably, the polymer (A) has a modulus of elongation of 24-32 GPa and has a melting point of 250-310° C. More preferably, the polymer (A) has a melting point of 250-290° C.

The liquid-crystalline polymer (A) used for the present invention may consist of one or more liquid-crystalline polyester and/or liquid-crystalline polyester amide. When two or more polymers are used, they may be separately combined with a liquid-crystalline polymer (B) or they may together be melt kneaded prior to be combined with the liquid-crystalline polymer (B). If liquid-crystalline polymer (A) comprises two or more resins, the blend of the resins should have a modulus of elongation and melting point within the above defined range.

Determination of Modulus of Elongation:

The modulus of elongation of the resin is measured using an ASTM4 type test piece according to ASTM D638 with Instron 5567 at room temperature at a moving speed of 5 mm/s.

Determination of Melting Point:

The differential scanning calorimeter Exstar 6000 (Seiko Instruments Inc., Chiba, Japan) or the same type of DSC device is used. The LCP sample to be examined is heated at the rate of 20° C./minute and endothermic peak (Tm1) is recorded. Thereafter, LCP sample is kept at a temperature 20-50° C. higher than Tm1 for 10 minutes. Then the sample is cooled to room temperature at the rate of 20° C./minute and then, heated again at the same rate. Endothermic peak found in the final step is recorded as melting point.

The liquid-crystalline polymer (A) used for the present invention may be a semi-aromatic liquid-crystalline polymer which includes aliphatic groups in the molecular chain or a wholly aromatic liquid-crystalline polymer whose molecular chain consists of aromatic groups. Among these liquid-crystalline polymers, wholly aromatic liquid-crystalline polymers are preferable because of their flame retardancy and good mechanical properties.

Examples of repeating units in the liquid-crystalline polymer (A) are aromatic oxycarbonyl, aromatic di-carbonyl, aromatic dioxy, aromatic aminooxy, aromatic aminocarbonyl, aromatic diamino, aromatic oxydicarbonyl and aliphatic dioxy repeating units.

The liquid-crystalline polymer composed of the above described repeating units may include both of those give anisotropic melt phase and those do not, depending on structural components of the polymer and ratio and sequence distribution of the components. The liquid-crystalline polymer (A) used for the present invention is limited to those exhibit anisotropic melt phase.

Examples of monomers which provide the aromatic oxycarbonyl repeating units are p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy- or halogen-substituted derivatives thereof as well as ester forming derivatives such as acyl derivatives, ester derivatives and acyl halide thereof. Among the above, p-hydroxybenzoic acid and 6-hydroxy-2-naphthoic acid are preferable in terms of controlling the properties and the melting point of the resulting liquid-crystalline polymer blend.

Examples of monomers which provide the aromatic di-carbonyl repeating units are aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, and alkyl-, alkoxy or halogen-substituted derivatives thereof as well as ester forming derivatives such as ester derivatives, acid halide thereof. Among the above, terephthalic acid and 2,6-naphthalenedicarboxylic acid are preferable in terms of controlling mechanical properties, heat resistance, melting point and molding properties of the resulting liquid-crystalline polymer blend.

Examples of monomers which provide the aromatic dioxy repeating units are aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether, and alkyl-, alkoxy- or halogen-substituted derivatives as well as ester forming derivatives such as acyl derivatives thereof. Among the above, hydroquinone and 4,4'-dihydroxybiphenyl are preferable in terms of the good reactivity during the polymerization process and the good properties of the resulting liquid-crystalline polymer blend.

Examples of monomers which provide the aromatic aminooxy repeating units are aromatic hydroxyamines such as p-aminophenol, m-aminophenol, 4-amino-1-naphthol, 5-amino-1-naphthol, 8-amino-2-naphthol, 4-amino-4'-hydroxybiphenyl, and alkyl-, alkoxy- or halogen-substituted derivatives as well as ester forming derivatives such as acyl derivatives thereof and amide forming derivatives such as N-acyl derivatives thereof.

Examples of monomers which provide the aromatic aminocarbonyl repeating units are aromatic aminocarboxylic acids such as p-aminobenzoic acid, m-aminobenzoic acid, 6-amino-2-naphthoic acid, and alkyl-, alkoxy- or halogen-substituted derivatives as well as ester forming derivatives such as acyl derivatives, ester derivatives and acid halide thereof and amide forming derivatives such as N-acyl derivatives thereof.

Examples of monomers which provide the aromatic diamino repeating units are aromatic diamines such as p-phenylenediamine, m-phenylenediamine, 1,5-diaminonaphthalene, 1,8-diaminonaphthalene and alkyl-, alkoxy- or halogen-substituted derivatives as well as amide forming derivatives such as N-acyl derivatives thereof.

Examples of monomers which provide the aromatic oxydicarbonyl repeating units are hydroxy-aromatic dicarboxylic acids such as 3-hydroxy-2,7-naphthalenedicarboxylic acid, 4-hydroxyisophthalic acid, 5-hydroxyisophthalic acid, and alkyl-, alkoxy- or halogen-substituted derivatives thereof as well as ester forming derivatives such as acyl derivatives, ester derivatives and acyl halide thereof.

Examples of monomers which provide the aliphatic dioxy repeating units are aliphatic diols such as ethylene glycol, 1,4-butanediol, 1,6-hexanediol, and acyl derivatives thereof. In addition, the liquid-crystalline polymer having an aliphatic dioxy repeating unit can be obtained by reacting polyesters having the aliphatic dioxy repeating units such as polyethylene terephthalate or polybutylene terephthalate with the above aromatic oxycarboxylic acids, aromatic dicarboxylic acids, aromatic diols, aromatic hydroxyamines, aromatic aminocarboxylic acids, aromatic diamines or acyl derivatives, ester derivatives or acid halide thereof.

The liquid-crystalline polymer (A) used for the present invention may have thioester bonding unless the bonding does not impair the object of the present invention. Examples of monomers which provide thioester bonding are mercapto-aromatic carboxylic acid, aromatic dithiol and hydroxy-aromatic thiol. The proportion of these additional monomers based on the total amount of monomers which provide aromatic oxycarbonyl, aromatic di-carbonyl, aromatic dioxy, aromatic aminooxy, aromatic diamino, aromatic oxy di-carbonyl and aliphatic dioxy repeating units is preferably not more than 10 mol %.

Among the above, the preferred liquid-crystalline polymers (A) used for the present invention are those comprising 6-oxy-2-naphthoyl repeating unit represented by following formula (I).

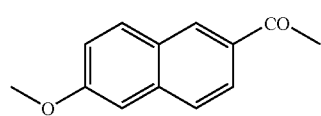

(I)

When the liquid-crystalline polymer (A) comprises the repeating unit represented by formula (I), the proportion of said repeating unit in the liquid-crystalline polymer (A) may preferably be 50-80 mol %, more preferably 50-70 mol %, and most preferably 50-65 mol % based on the total repeating units of the polymer (A).

According to the present invention, a liquid-crystalline polymer (A-1) which consists of the following repeating units is especially preferable as LCP (A) in view of its high modulus of elongation and good processability:

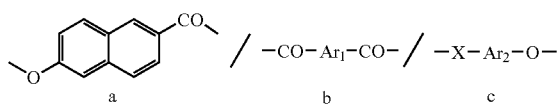

wherein,
$Ar_1$ and $Ar_2$ each represent at least one bivalent aromatic group;
X represents O or NH; and
a, b and c represent relative molar portion (mol %) of the repeating units in the liquid-crystalline polymer (A) and satisfy the following formulae:

50 mol % $\leq a \leq$ 80 mol %

10 mol % $\leq b \leq$ 25 mol %

10 mol % $\leq c \leq$ 25 mol %

$a+b+c=100$ mol %.

Among the liquid-crystalline polymers (A-1), those satisfy the following formula are preferable:

b=c.

In the liquid-crystalline polymer (A-1) used for the present invention, preferable examples of $Ar_1$ and $Ar_2$ are phenylene, naphthylene, biphenylene groups. More preferably, both of $Ar_1$ and $Ar_2$ are phenylene groups and most preferably, both of $Ar_1$ and $Ar_2$ are para-phenylene groups.

In the liquid-crystalline polymer (A-1) used for the present invention, X is preferably NH. In other words, a liquid-crystalline polyester amide is preferable.

The liquid-crystalline polymer (B) contained in the liquid-crystalline polymer blend of the present invention is described.

The liquid-crystalline polymer (B) is liquid-crystalline polyester or liquid-crystalline polyester amide which exhibits anisotropic melt phase and is called as thermotropic liquid-crystalline polymer by those skilled in the art.

The anisotropic melt phase of the liquid-crystalline polymer (B) can be confirmed in the same way as the liquid-crystalline polymer (A).

The liquid-crystalline polymer (B) used for the present invention is not specifically limited and may be any liquid-crystalline polymer which has a melting point measured by differential scanning calorimeter of equal to or higher than 190° C. and lower than 250° C. Preferably, the polymer (B) has a melting point of 200-240° C. and more preferably, 210-230° C.

The liquid-crystalline polymer (B) used for the present invention may consist of one or more liquid-crystalline polyester and/or liquid-crystalline polyester amide. When two or more resins are used, they may be separately combined with a liquid-crystalline polymer (A) or they may together be melt kneaded prior to be combined with the liquid-crystalline polymer (A). If the liquid-crystalline polymer (B) comprises two or more resins, the blend of the resins should have a melting point within the range defined above.

The melting point of liquid-crystalline polymer (B) can be determined by the same method as that used for the liquid-crystalline polymer (A).

The liquid-crystalline polymer (B) used for the present invention may be semi-aromatic liquid-crystalline polymer which includes aliphatic groups in the molecular chain or may be wholly aromatic liquid-crystalline polymer whose molecular chain consists of aromatic groups. Among these liquid-crystalline polymers, wholly aromatic liquid-crystalline polymers are preferable because of their flame retardancy and good mechanical properties.

Examples of repeating units in the liquid-crystalline polymer (B) are aromatic oxycarbonyl, aromatic di-carbonyl, aromatic dioxy, aromatic aminooxy, aromatic aminocarbonyl, aromatic diamino, aromatic oxydicarbonyl and aliphatic dioxy repeating units.

The above described examples of monomers which provide repeating units contained in the liquid-crystalline polymer (A) may preferably be used for preparing liquid-crystalline polymer (B).

The liquid-crystalline polymer composed of the above described repeating units may include both of those give anisotropic melt phase and those do not, depending on structural components of the polymer, and ratio and sequence distribution of the components. The liquid-crystalline polymer (B) used for the present invention are limited to those exhibit anisotropic melt phase.

The liquid-crystalline polymer (B) used for the present invention may have thioester bonding unless the bonding does not impair the object of the present invention. Examples of monomers which provide thioester bonding are mercapto-aromatic carboxylic acid, aromatic dithiol and hydroxy-aromatic thiol. The proportion of these additional monomers based on the total amount of monomers which provide aromatic oxycarbonyl, aromatic di-carbonyl, aromatic dioxy, aromatic aminooxy, aromatic aminocarbonyl, aromatic oxy di-carbonyl and aliphatic dioxy repeating units is preferably not more than 10 mol %.

According to the present invention, a liquid-crystalline polymer (B-1) which consists of the following repeating units is especially preferable as LCP (B) in view of its good mechanical properties and good processability:

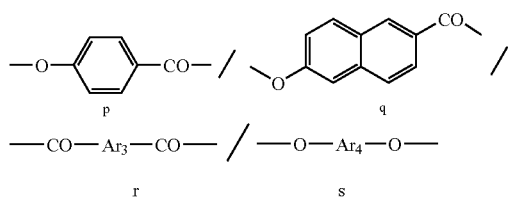

wherein,
$Ar_3$ and $Ar_4$ each represent at least one bivalent aromatic group; and
p, q, r and s represent relative molar portion (mol %) of the repeating units in the liquid-crystalline polymer (B) and satisfy the following formulae:

$0.4 \leq q/p \leq 2.0$ $2 \text{ mol }\% \leq r \leq 15 \text{ mol }\%$ $2 \text{ mol }\% \leq s \leq 15 \text{ mol }\%$ $p+q+r+s=100 \text{ mol }\%$.

Among the liquid-crystalline polymers (B-1), those satisfy the following formula are preferable:

r=s.

Examples of combinations of repeating units which give the preferable liquid-crystalline polymer (B) with a low melting point and good mechanical properties are as follows:

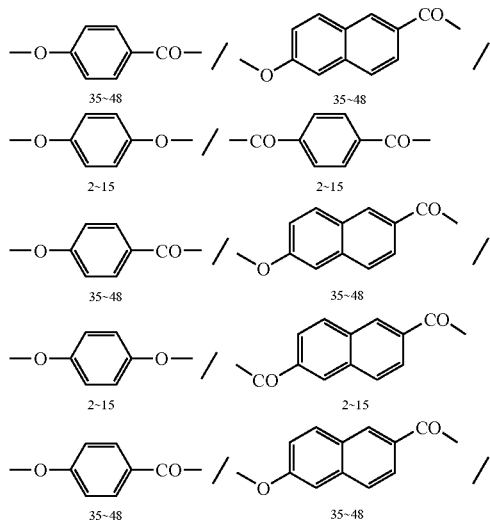

-continued

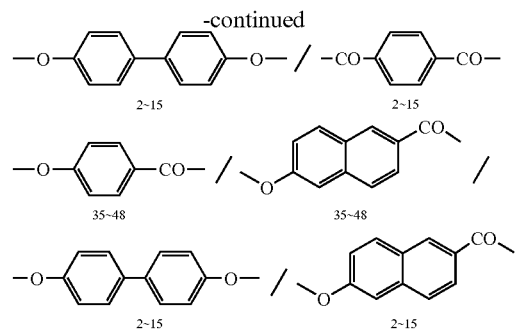

wherein,
the number lower right of the repeating unit represents mol % of each repeating unit in the liquid-crystalline polymer (B).

Among the above, the following combination of repeating units gives the especially preferable liquid-crystalline polymer (B):

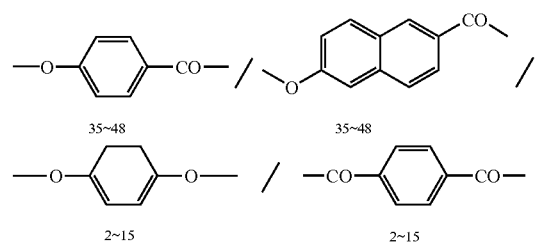

wherein,
the number lower right of the repeating unit represents mol % of each repeating unit in the liquid-crystalline polymer (B).

The method for preparing the liquid-crystalline polymers (A) and (B) used for the present invention is not limited and any method known to the art can be employed. For example, conventional polymerization methods such as molten acidolysis and slurry polymerization methods for preparing polymer to give ester and/or amide bonding among the above described monomer components may be employed.

The molten acidolysis method is preferably used for preparing the liquid-crystalline polymers (A) and (B). In this method, the monomers are heated to give molten solution and then the solution is reacted to give the molten polymer. The final step of this method may be carried out under vacuum to facilitate removal of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer may be in the form of lower acyl derivative obtained by acylating the hydroxyl group and/or amino group. The lower acyl group may have preferably 2-5, more preferably 2-3 carbon atoms. Acetylated monomers are most preferably used for the reaction.

The lower acyl derivatives of the monomers may be those prepared beforehand by acylating the monomers independently or may be those produced in the reaction system by adding an acylating agent such as acetic anhydride to the monomers upon preparing the liquid-crystalline polymer.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; salts of inorganic acid (ex. $K_2SO_4$); Lewis acid (ex. $BF_3$) and gaseous acid catalysts such as halogenated hydrogen (ex. HCl).

When a catalyst is used, the amount of the catalyst added to the reaction based on the total monomers may preferably be 10-1000 ppm, and more preferably 20-300 ppm.

The liquid-crystalline polymer (A) and the liquid-crystalline polymer (B) may be obtained from the polymerizing reaction vessel in molten state and processed to give pellets, flakes or powders.

The liquid-crystalline polymer blend of the present invention is obtained by combining the liquid-crystalline polymer (A) and the liquid-crystalline polymer (B) so that the weight ratio of the polymer (A) to the polymer (B) is from 50:50 to 90:10. The liquid-crystalline polymer blend of the present invention may be obtained by melt kneading the mixture of the polymers (A) and (B) using a kneading machine such as Banbury mixer, kneader, single screw extrudor, twin screw extruder or the like.

The weight ratio of the liquid-crystalline polymer (A) to the liquid-crystalline polymer (B) is from 50:50 to 90:10, preferably from 60:40 to 90:10, more preferably from 70:30 to 90:10, and most preferably from 80:20 to 90:10.

When the amount of the liquid-crystalline polymer (A) to the total weight of the liquid-crystalline polymer blend is more than 90 weight percent, the liquid-crystalline polymer blend will not exhibit sufficient flowability or processability at low temperatures. On the other hand, when the amount is less than 50 weight percent, the liquid-crystalline polymer blend will not exhibit sufficient mechanical properties such as modulus of elongation.

The melting point measured by differential scanning calorimeter of the resulting liquid-crystalline polymer blend of the present invention is 200-270° C., and preferably equal to or higher than 200° C. and lower than 250° C.

The liquid-crystalline polymer blend of the present invention exhibits good flowability, good molding processability at low temperatures and good mechanical properties such as modulus of elongation.

The present invention further provides a liquid-crystalline polymer blend composition comprising the liquid-crystalline polymer blend of the present invention and other ingredients.

The liquid-crystalline polymer blend composition of the present invention may be those obtained by admixing one or more inorganic and/or organic filler with the liquid-crystalline polymer blend of the present invention.

Examples of inorganic and/or organic fillers may include glass fiber, silica-alumina fiber, alumina fiber, carbon fiber, potassium titanate fiber, aluminum borate fiber, aramid fiber, talc, mica, graphite, wollastonite, dolomite, clay, glass flake, glass beads, glass balloon, calcium carbonate, barium sulfate and titanium oxide. Among them, glass fiber is preferably used because of its good balance of physical properties and cost.

The inorganic and/or organic fillers may be added to the liquid-crystalline polymer blend composition of the present invention in an amount of 0.1-200 parts by weight, preferably 1-100 parts by weight per 100 parts by weight of the total weight amount of the liquid-crystalline polymer (A) and the liquid-crystalline polymer (B).

The liquid-crystalline polymer blend composition according to the present invention may further be admixed with one or more additives, which are conventionally used for resin compositions, if desired. For example, molding lubricant such as higher aliphatic acid, higher aliphatic ester, higher aliphatic amide, higher aliphatic acid metal salt, polysiloxane and fluorocarbon resin; colorant such as dyes and pigments; antioxidant; thermal stabilizer; UV absorbent; antistatic agent; and surface active agent may be admixed. The term "higher" group herein used refers to the group of 10-25 carbon atoms.

Molding lubricants such as higher aliphatic acid, higher aliphatic ester, higher aliphatic acid metal salt or fluorocarbon-type surfactant may be added to the liquid-crystalline polymer blend or the liquid-crystalline polymer blend composition before subjecting the pellets to the molding process, so that the agent adhere to the outer surface of the pellet.

The liquid-crystalline polymer blend composition of the present invention may comprise one or more additional resin component which can be subjected to processing such as molding at the same range of the temperatures as the liquid-crystalline polymer blend of the present invention, unless the additional resin component does not impair the object of the present invention. Examples of the additional resin components include thermoplastic resins such as polyamide, polyester, polyacetal, polyphenylene ether and denatured derivatives thereof, polysulfone, polyethersulfone, polyether imide and polyamideimide, and thermosetting resins such as phenol resin, epoxy resin and polyimide resin. The amount of the additional resin components is not limited, and may be determined dependent on the intended property. Typically, such additional resins may be added to the liquid-crystalline polymer blend composition in an amount of 0.1-100 parts by weight, preferably 0.1-80 parts by weight per 100 parts by weight of the total weight amount of the liquid-crystalline polymer (A) and the liquid-crystalline polymer (B).

The liquid-crystalline polymer blend composition of the present invention may be obtained by adding the inorganic and/or organic fillers, additives and other resin components to the liquid-crystalline polymer blend of the present invention and melt kneading the mixture using a kneading machine such as Banbury mixer, kneader, single screw extruder, twin screw extruder or the like.

The inorganic and/or organic fillers, additives and other resin components may be admixed to the liquid-crystalline polymer blend of the present invention during or after the liquid-crystalline polymer (A) and liquid-crystalline polymer (B) are combined by melt kneading.

The liquid-crystalline polymer blend composition of the present invention may be processed in a conventional manner to give molded article, film, sheet, bonded textile and the like. For example, injection molding or extrusion techniques may be preferably used.

In particular, the liquid-crystalline polymer blend and the liquid-crystalline polymer blend composition of the present invention exhibit excellent molding flowability and they can be suitably used for manufacturing cross flow fans or components thereof with very thin parts, as thin as 0.8 mm or less of the thickness, used for indoor equipment of air-conditioning machine.

The liquid-crystalline polymer blend and the liquid-crystalline polymer blend composition of the present invention have a low melting point and good molding processability at low temperatures and therefore, they can be effectively processed by a secondary processing operation such as welding.

The present invention further provides a method for manufacturing a molded article with a joint comprising the step of joining more than one components obtained by molding the liquid-crystalline polymer blend or the liquid-crystalline polymer blend composition of the present invention, wherein the joining step is carried out by ultrasonic welding, vibration welding, high-frequency welding, electromagnetic induction welding, impulse welding or spin welding.

In the present specification and claims, the term "molded article" refers to an article made of the liquid-crystalline polymer blend or the liquid-crystalline polymer blend composition of the present invention with or without a weld joint. The term refers to both an article which has been obtained by joining two or more components by secondary processing such as welding and that which has not been subjected to such secondary processing.

The term "component" refers to a part made of the liquid-crystalline polymer blend or the liquid-crystalline polymer blend composition of the present invention with or without joint which composes a completed article and which is subjected to secondary processing to give a completed article.

In order to join two or more components obtained by molding the liquid-crystalline polymer blend or the liquid-crystalline polymer blend composition of the present invention, welding machines such as ultrasonic welder, high-frequency welder, electromagnetic induction welder, impulse welder, vibration welder and spin welder can be suitably employed.

Those joining methods (welding methods) are briefly described below.

<Ultrasonic Welding>

In this method, ultrasonic electrical energy is converted into mechanical vibration energy which induces frictional heat at the joint surface of the resin parts to be welded so that they can be welded together.

<High-frequency Welding>

In this method, dielectric heat is generated inside the parts to be welded by means of high-frequency radiation so that they can be welded together.

<Electromagnetic Induction Welding>

In this method, metal or magnetic material which is placed at the joining portion of the parts to be welded is selectively heated so that the parts are indirectly heated and they can be welded together.

<Impulse Welding>

In this method, the parts are pressurized by means of a pressure pad and then, the nickel chrome wire band mounted at the top of the pressure pad is heated instantaneously to soften or melt the parts so that they can be welded together.

<Vibration Welding>

In this method, both of the parts to be welded are placed under pressure, one of them is vibrated horizontally to induce frictional heat at the welding surface so that the parts can be welded together.

<Spin Welding>

In this method, round shaped molded parts are placed under pressure, the articles are spun at a high speed to induce frictional heat and the parts are welded.

Among the above joining/welding methods, ultrasonic welding, vibration welding or spin welding is especially preferable for the present invention in view of welding properties of large or complex-shaped articles.

The liquid-crystalline polymer blend and the liquid-crystalline polymer blend composition of the present invention have low melting point and are suitably used for manufacturing the molded article having a weld joint with high mechanical strength.

In addition, components made of the liquid-crystalline polymer blend and the liquid-crystalline polymer blend composition of the present invention are easily processed by a secondary processing operation even if they have very thin or meticulous parts, because of their good molding flowability and good molding processability at low temperatures. By joining components for cross flow fans made of the liquid-crystalline polymer blend or the liquid-crystalline polymer blend composition of the present invention, very thin and small cross flow fans for indoor equipment of air conditioner and the like can be manufactured.

The present invention is further described in reference to the following Examples.

EXAMPLES

In the examples, following abbreviations are used.
BON6: 6-hydroxy-2-naphthoic acid
POB: para-hydroxybenzoic acid
AcPAP: para-acetyl aminophenol
HQ: hydroquinone
TPA: terephthalic acid Synthesis Example 1

Synthesis of LCP-I (Liquid-crystalline Polymer (A))

BON6, AcPAP and TPA were fed in a reaction container equipped with an agitating device with torque-meter and a condenser in the ratio shown in table 1 so that the total monomer amount was 5 mol. Then potassium acetate 0.2 g (227 ppm to the total amount of the monomers) and acetic anhydride 1.030 fold moles to the total amount (moles) of hydroxy groups of the monomers were added to the container. The mixture was polymerized under the following condition.

TABLE 1

| Synthesis Example 1, monomer ratio | | | |
|---|---|---|---|
|  | BON6 | AcPAP | TPA |
| g | 565 | 151 | 166 |
| mol % | 60 | 20 | 20 |

Under the nitrogen atmosphere, the mixture was heated from room temperature to 150° C. over 1 hour and kept at 150° C. for 60 minutes, then rapidly heated to 240° C. with distilling out the by-product acetic acid and kept at the temperature for 60 minutes. Then the mixture was heated to 335° C. over 3 hours and the pressure was reduced to 30 mmHg over 60 minutes. When the torque became the predetermined level, the polymerizing reaction was terminated. The resulting polymer was removed from the container and crushed by crusher to give pellets of LCP. As a result, approximately theoretical amount of acetic acid was distilled out.

The melting point of the resulting liquid-crystalline polymer determined by DSC was 280° C.

The resulting liquid-crystalline polymer pellets were dried at 130° C. for four hours and then the test piece of the LCP-I was produced using injection molder UH 1000-100 (Nissei Plastic Industrial Co., Ltd., Japan) with cylinder temperature of 320° C. and die temperature of 70° C. The modulus of elongation of the test piece was 27 GPa.

Synthesis Example 2

Synthesis of LCP-II (Liquid-crystalline Polymer (B))

BON6, POB, HQ and TPA were fed in a reaction container equipped with an agitating device with torque-meter and a condenser in the ratio shown in table 2 so that the total monomer amount was 5 mol. Then potassium acetate 0.05 g (63 ppm to the total amount of the monomers) and acetic anhydride 1.025 fold moles to the total amount (moles) of hydroxy groups of the monomers were added to the container. The mixture was polymerized under the following condition.

TABLE 2

| Synthesis Example 2, monomer ratio | | | | |
|---|---|---|---|---|
| | BON6 | POB | HQ | TPA |
| g | 386 | 297 | 44 | 67 |
| mol % | 41 | 43 | 8 | 8 |

Under the nitrogen atmosphere, the mixture was heated from room temperature to 150° C. over 1 hour and kept at 150° C. for 30 minutes, then rapidly heated to 210° C. with distilling out the by-product acetic acid and kept at the temperature for 30 minutes. Then the mixture was heated to 335° C. over 3 hours and the pressure was reduced to 20 mmHg over 30 minutes. When the torque became the predetermined level, the polymerizing reaction was terminated. The resulting polymer was removed from the container and crushed by crusher to give pellets of LCP. As a result, approximately theoretical amount of acetic acid was distilled out.

The melting point of the resulting liquid-crystalline polymer determined by DSC was 218° C.

The resulting liquid-crystalline polymer pellets were dried at 130° C. for four hours and then the test piece of the LCP-II was produced using injection molder UH 1000-100 (Nissei Plastic Industrial Co., Ltd., Japan) with cylinder temperature of 320° C. and die temperature of 70° C. The modulus of elongation of the test piece was 12 GPa.

Synthesis Example 3

Synthesis of LCP-III

POB and BON6 were fed in a reaction container equipped with an agitating device with torque-meter and a condenser in the ratio shown in table 3 so that the total monomer amount was 5 mol. Then potassium acetate 0.05 g (67 ppm to the total amount of the monomers) and acetic anhydride 1.025 fold moles to the total amount (moles) of hydroxy groups of the monomers were added to the container. The mixture was polymerized under the following condition.

TABLE 3

| Synthesis Example 3, monomer ratio | | |
|---|---|---|
| | POB | BON6 |
| g | 504 | 254 |
| mol % | 73 | 27 |

Under the nitrogen atmosphere, the mixture was heated from room temperature to 150° C. over 1 hour and kept at 150° C. for 30 minutes, then rapidly heated to 210° C. with distilling out the by-product acetic acid and kept at the temperature for 30 minutes. Then the mixture was heated to 325° C. over 3 hours and the pressure was reduced to 20 mmHg over 30 minutes. When the torque became the predetermined level, the polymerizing reaction was terminated. The resulting polymer was removed from the container and crushed by crusher to give pellets of LCP. As a result, approximately theoretical amount of acetic acid was distilled out.

The melting point of the resulting liquid-crystalline polymer determined by DSC was 280° C.

The resulting liquid-crystalline polymer pellets were dried at 130° C. for four hours and then the test piece of the LCP-III was produced using injection molder UH 1000-100 (Nissei Plastic Industrial Co., Ltd., Japan) with cylinder temperature of 320° C. and die temperature of 70° C. The modulus of elongation of the test piece was 13 GPa.

Example 1

LCP-I (A), LCP-II (B) and Glass fiber (T-747 Nippon Electric Glass Co., Ltd., Japan) in the weight ratio of 49:21:30 (the weight ratio of LCP-I (A) to LCP-II (B) was 70:30) were mixed and melt kneaded at 320° C. and then extruded by Twin-Screw Extruder (TEX 30, The Japan Steel Works, LTD., Tokyo, Japan) to give pellets of the liquid-crystalline polymer blend composition. The resulting pellets were dried at 130° C. for 4 hours and molded by UH 1000-100 (Nissei Plastic Industrial Co., Ltd., Japan) with cylinder temperature of 320° C. and die temperature of 70° C. to give test pieces used for the ultrasonic welding test having the shape of shear joint shown in FIG. 1 and the test piece used for measuring modulus of elongation.

The former test pieces were welded to give jointed articles by means of ultrasonic welder (BRANSON 950M, Emerson Japan, Ltd., Japan) under conditions as follows.

The joint strength of the resulting jointed article was evaluated as breaking force at tensile rate of 5 mm/sec in vertical direction to the jointed surface by using Instron Corporation #5567. The melting point, modulus of elongation of the liquid-crystalline polymer blend composition and the joint strength of the jointed articles made of the liquid-crystalline polymer blend composition are shown in table 4.

<Ultrasonic Welding Condition>
Vibration: 20 KHz
Horn: conical horn, TIN, ¾ inched diameter
Welding time: 80 msec
Holding Time: 0.5 sec Example 2

The liquid-crystalline polymer blend composition was obtained by the same method as Example 1 except that LCP-I (A), LCP-II (B) and Glass fiber in the weight ratio shown in Table 4 (the weight ratio of LCP-I (A) to LCP-II (B) was 80:20) were mixed.

The melting point, modulus of elongation of the liquid-crystalline polymer blend composition and the joint strength of the jointed articles made of the liquid-crystalline polymer blend composition are shown in table 4.

Example 3

The liquid-crystalline polymer blend composition was obtained by the same method as Example 1 except that LCP-I (A), LCP-II (B) and Glass fiber in the weight ratio shown in Table 4 (the weight ratio of LCP-I (A) to LCP-II (B) was 60:40) were mixed.

The melting point, modulus of elongation of the liquid-crystalline polymer blend composition and the joint strength of the jointed articles made of the liquid-crystalline polymer blend composition are shown in table 4.

Comparative Example 1

The liquid-crystalline polymer composition was obtained by the same method as Example 1 except that LCP-I (A) and Glass fiber in the weight ratio shown in Table 4 were mixed.

The melting point, modulus of elongation of the liquid-crystalline polymer composition and the joint strength of the jointed articles made of the liquid-crystalline polymer composition are shown in table 4.

Comparative Example 2

The liquid-crystalline polymer composition was obtained by the same method as Example 1 except that LCP-I (A), LCP-III and Glass fiber in the weight ratio shown in Table 4 were mixed.

The melting point, modulus of elongation of the liquid-crystalline polymer composition and the joint strength of the jointed articles made of the liquid-crystalline polymer composition are shown in table 4.

Comparative Example 3

The liquid-crystalline polymer composition was obtained by the same method as Example 1 except that LCP-II (B) and Glass fiber in the weight ratio shown in Table 4 were mixed and melt kneaded at 230° C.

The melting point, modulus of elongation of the liquid-crystalline polymer composition and the joint strength of the jointed articles made of the liquid-crystalline polymer composition are shown in table 4.

Comparative Example 4

The liquid-crystalline polymer composition was obtained by the same method as Example 1 except that LCP-I (A), LCP-II (B) and Glass fiber in the weight ratio shown in Table 4 (the weight ratio of the liquid-crystalline polymer (A) to the liquid-crystalline polymer (B) was 30:70) were mixed.

The melting point, modulus of elongation of the liquid-crystalline polymer composition and the joint strength of the jointed articles made of the liquid-crystalline polymer composition are shown in table 4.

The liquid-crystalline polymer blend compositions of the present invention of Example 1, Example 2 and Example 3 which contained 30 weight percent of glass fiber exhibited high modulus of elongations, melting points lower than 250° C. and high mechanical strength of joint welded by ultrasonic welding.

The liquid-crystalline polymer composition of Comparative Example 1 which consisted of 70 weight percent of LCP-I (liquid-crystalline polymer (A)) and 30 weight percent of glass fiber exhibited high modulus of elongation. However, the liquid-crystalline polymer composition of Comparative Example 1 showed high melting point and low mechanical strength of joint welded by ultrasonic welding.

The liquid-crystalline polymer composition of Comparative Example 2 which consisted of LCP-I (liquid-crystalline polymer (A)), LCP-III with high melting point and glass fiber exhibited high modulus of elongation. However, the liquid-crystalline polymer composition of Comparative Example 2 showed high melting point and relatively low mechanical strength of joint.

The liquid-crystalline polymer composition of Comparative Example 3 which consisted of 70 weight percent of LCP-II (liquid-crystalline polymer (B)) and 30 weight percent of glass fiber exhibited low melting point and high mechanical strength of joint. However, the liquid-crystalline polymer composition of Comparative Example 3 showed low modulus of elongation.

The liquid-crystalline polymer composition of Comparative Example 4 which contained 21 weight percent of LCP-I (liquid-crystalline polymer (A)), 49 weight percent of LCP-II (liquid-crystalline polymer (B)) and 30 weight percent of glass fiber (the ratio of the liquid-crystalline polymer (A) to the liquid-crystalline polymer (B) was 30:70) exhibited low melting point and high mechanical strength of joint. However, the liquid-crystalline polymer composition of Comparative Example 4 showed low modulus of elongation.

What is claimed is:
1. A liquid-crystalline polymer blend, which is obtained by combining:
(A) a liquid-crystalline polymer which has a modulus of elongation of 20-32 GPa and a melting point measured by differential scanning calorimeter of 250-330° C., and
(B) a liquid-crystalline polymer which has a melting point measured by differential scanning calorimeter of equal to or higher than 190° C. and lower than 250° C.,

TABLE 4

| | Composition (weight %) | | | | Melting point (° C.) | Modulus of elongation (GPa) | Mechanical strength of joint (N) |
|---|---|---|---|---|---|---|---|
| | LCP-I (A) | LCP-II (B) | LCP-III | Glass fiber | | | |
| Example 1 | 49 | 21 | 0 | 30 | 240 | 27 | 280 |
| Example 2 | 56 | 14 | 0 | 30 | 245 | 27 | 270 |
| Example 3 | 42 | 28 | 0 | 30 | 225 | 25 | 300 |
| Comparative Example 1 | 70 | 0 | 0 | 30 | 280 | 28 | 180 |
| Comparative Example 2 | 49 | 0 | 21 | 30 | 280 | 27 | 240 |
| Comparative Example 3 | 0 | 70 | 0 | 30 | 218 | 21 | 350 |
| Comparative Example 4 | 21 | 49 | 0 | 30 | 220 | 21 | 310 | wherein, the weight ratio of said liquid-crystalline polymer (A) to said liquid-crystalline polymer (B) is in the range of from 50:50 to 90:10.

2. The liquid-crystalline polymer blend according to claim 1, wherein the polymer blend has a melting point measured by differential scanning calorimeter of equal to or higher than 200° C. and lower than 250° C.

3. The liquid-crystalline polymer blend according to claim 1, wherein the liquid-crystalline polymer (A) comprises 50-80 mol % of the repeating unit represented by the following formula (I) in the total repeating units of the polymer (A)

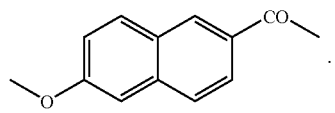
(I)

4. The liquid-crystalline polymer blend according to claim 3, wherein the liquid-crystalline polymer (A) consists of the following repeating units:

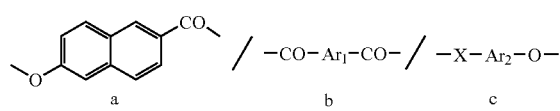

wherein,
$Ar_1$ and $Ar_2$ each represent at least one bivalent aromatic group;
X represents O or NH; and
a, b and c represent relative molar portion (mol %) of the repeating units in the liquid-crystalline polymer (A) and satisfy the following formulae:

50 mol % $\leq a \leq$ 80 mol %

10 mol % $\leq b \leq$ 25 mol %

10 mol % $\leq c \leq$ 25 mol %

$a+b+c$=100 mol %.

5. The liquid-crystalline polymer blend according to claim 4, wherein $Ar_1$ and $Ar_2$ represent paraphenylene group and X represents NH.

6. The liquid-crystalline polymer blend according to claim 1, wherein the liquid-crystalline polymer (B) consists of the following repeating units:

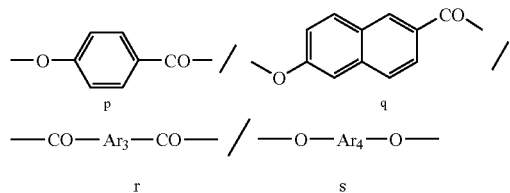

wherein,
$Ar_3$ and $Ar_4$ each represent at least one bivalent aromatic group; and p, q, r and s represent relative molar portion (mol %) of the repeating units in the liquid-crystalline polymer (B) and satisfy the following formulae:

$0.4 \leq q/p \leq 2.0$ 2 mol % $\leq r \leq$ 15 mol %

2 mol % $\leq s \leq$ 15 mol %

$p+q+r+s$=100 mol %.

7. The liquid-crystalline polymer blend according to claim 6, wherein the liquid-crystalline polymer (B) consists of the following repeating units:

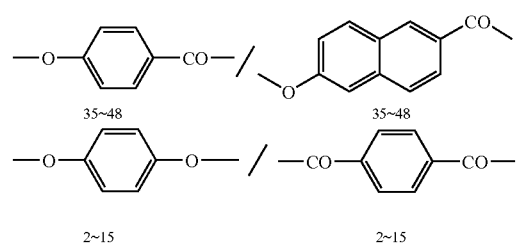

wherein,
the number lower right of the repeating unit represents mol % of each repeating unit in the liquid-crystalline polymer (B).

8. A liquid-crystalline polymer blend composition comprising at least one inorganic and/or organic filler in an amount of 0.1-200 parts by weight per 100 parts by weight of the liquid-crystalline polymer blend according to claim 1.

9. The liquid-crystalline polymer blend composition according to claim 8, wherein the inorganic and/or organic filler is glass fiber.

10. A molded article obtainable by molding a liquid-crystalline polymer blend, which is obtained by combining:
(A) a liquid-crystalline polymer which has a modulus of elongation of 20-32 GPa and a melting point measured by differential scanning calorimeter of 250-330° C., and
(B) a liquid-crystalline polymer which has a melting point measured by differential scanning calorimeter of equal to or higher than 190° C. and lower than 250° C.,
wherein the weight ratio of said liquid-crystalline polymer (A) to said liquid-crystalline polymer (B) is in the range of from 50:50 to 90;10, or
a composition comprising said liquid-crystalline polymer blend.

11. The molded article according to claim 10, which is a cross-flow fan or a component thereof.

12. The molded article according to claim 11, wherein the cross-flow fan or the component thereof has a thin wall part whose thickness is equal to or less than 0.8 mm.

13. A method for manufacturing a molded article with a joint comprising the step of joining more than one components obtained by molding
a liquid-crystalline polymer blend, which is obtained by combining:
(A) a liquid-crystalline polymer which has a modulus of elongation of 20-32 GPa and a melting point measured by differential scanning calorimeter of 250-330° C., and
(B) a liquid-crystalline polymer which has a melting point measured by differential scanning calorimeter of equal to or higher than 190° C. and lower than 250° C., wherein, the weight ratio of said liquid-crystalline polymer (A) to said liquid-crystalline polymer (B) is in the range of from 50:50 to 90:10, or a composition comprising said liquid-crystalline polymer blend, wherein, the joining step is carried out by ultrasonic welding, vibration welding, high-frequency welding, electromagnetic induction welding, impulse welding or spin welding.

14. The method according to claim 13, wherein the molded article is a cross-flow fan or a component thereof.

* * * * *